Sept. 16, 1969  E. E. ROLLMAN  3,466,684
METHOD OF MANUFACTURE OF FOOTWEAR WITH MOLDED SOLES
AND FOOTWEAR SO MANUFACTURED
Original Filed Oct. 3, 1962  3 Sheets-Sheet 1
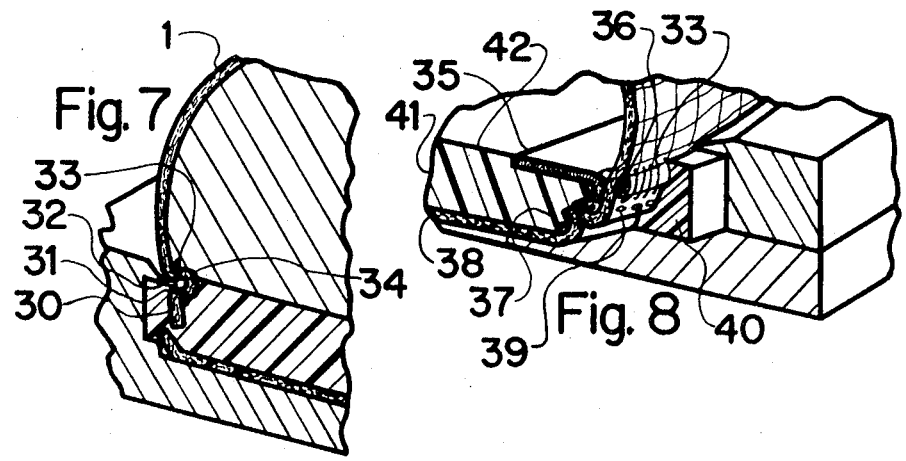
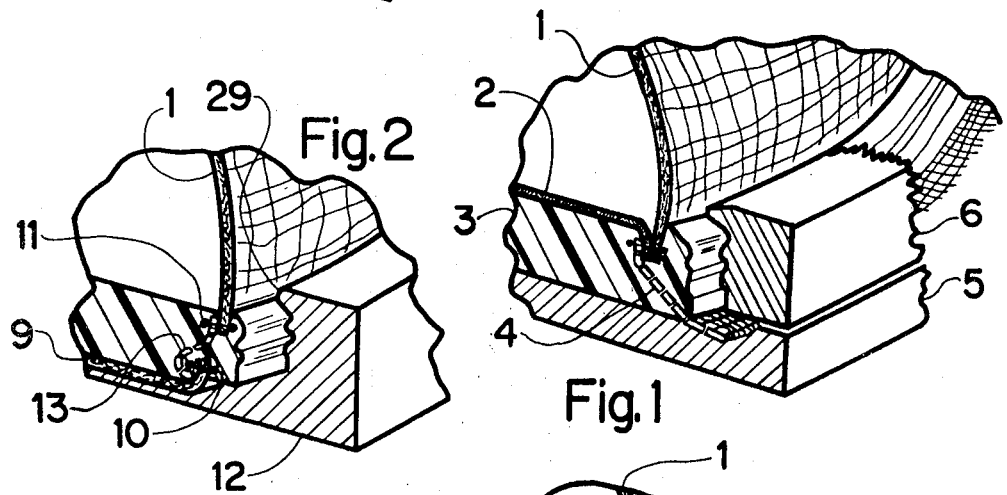
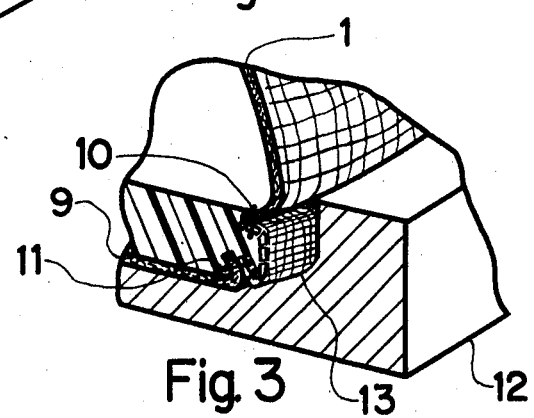

Sept. 16, 1969   E. E. ROLLMAN   3,466,684
METHOD OF MANUFACTURE OF FOOTWEAR WITH MOLDED SOLES
AND FOOTWEAR SO MANUFACTURED
Original Filed Oct. 3, 1962   3 Sheets-Sheet 2

Sept. 16, 1969　　　　E. E. ROLLMAN　　　　3,466,684
METHOD OF MANUFACTURE OF FOOTWEAR WITH MOLDED SOLES
AND FOOTWEAR SO MANUFACTURED
Original Filed Oct. 3, 1962　　　　　　　　3 Sheets-Sheet 3

3,466,684
Patented Sept. 16, 1969

3,466,684
METHOD OF MANUFACTURE OF FOOTWEAR WITH MOLDED SOLES AND FOOTWEAR SO MANUFACTURED
Ernest E. Rollman, Waynesville, N.C., assignor to Ro-Search, Incorporated, Waynesville, N.C.
Original application Oct. 3, 1962, Ser. No. 228,150, now Patent No. 3,345,763. Divided and this application Nov. 22, 1966, Ser. No. 596,283
Int. Cl. A43d 9/00, 11/00, 31/00
U.S. Cl. 12—142                    7 Claims

ABSTRACT OF THE DISCLOSURE

A process of manufacturing footwear with soles of elastomeric material molded and cured to the bottom margin of the upper wherein pressure exerted for the molding of the elastomeric material in a closed mold is also used for the stretching and tightening of the upper on the last, either by holding the bottom margin of the upper in the mold cavity while moving the mold last away from the cavity or by holding the last in fixed relation to the mold cavity and pulling the bottom margin into the mold cavity to obtain relative movement between the last and upper.

---

This application is a division of my co-pending application, Ser. No. 228,150, filed Oct. 3, 1962, now Patent No. 3,345,763.

The invention refers to the manufacture of footwear with soles molded and cured directly to an upper.

It is customary to manufacture such footwear, if good fit is required such as for leather shoes, by lasting the upper over an insole, then transferring this assembly on the last of a mold and molding and curing its sole thereto. This sole might be rubber, bonded and vulcanized to the upper under heat and pressure, or other elastomeric material which requires only heat or only pressure to fill the mold and to cure.

In order to avoid the expensive lasting of the upper prior to placing it into the mold my earlier Patent 2,789,295 disclosed a method of manufacture in which the lasting of the upper is effected in the mold by forcing the bottom margin of the upper essentially horizontally towards the center of the sole so as to stretch and tighten the upper on the last. Such movement of the bottom margin is obtained by the closing of the side frames of the mold, which grip the bottom margin. In order to obtain close fit of specific sizes it is necessary to pattern the upper with close consideration of the stretch which might be expected of specific types and qualities of the leather upper.

Figure 4:
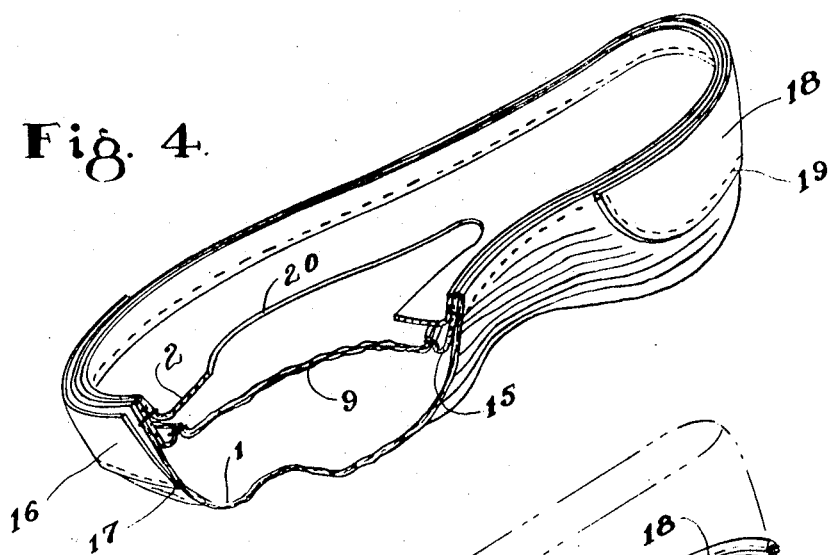
Figure 5:
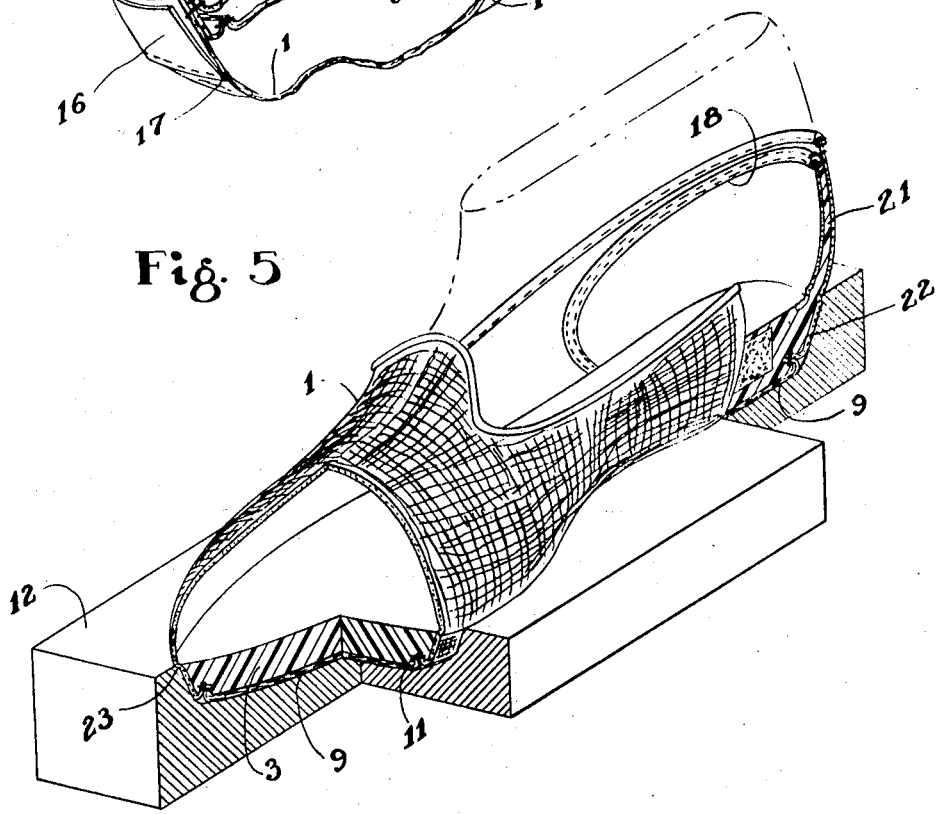
Figure 6:
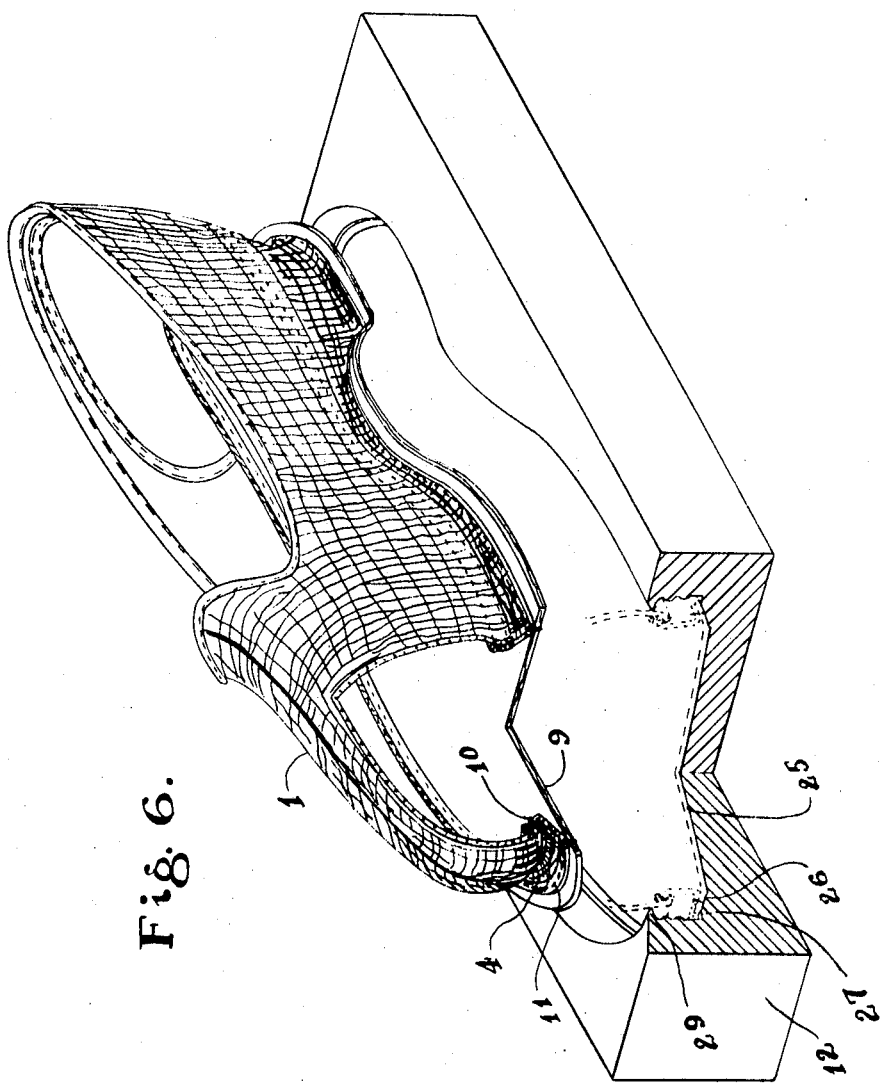

According to the present invention footwear of good and permanent fit can be obtained by using the pressure of the elastomeric material of the sole to cause a relative movement of upper and last in a vertical direction. The invention provides that the bottom margin of the upper is moved downward relative to the last by the pressure of the elastomeric material, to the point where full stretch and good tightening of the upper on the last is obtained. The elastomeric material will fill the space between the level of the bottom margin of the upper and the bottom surface of the last, so that the size of the footwear, i.e. the space available for the foot of the wearer, is exactly of the desired dimensions. While it is an essential object of the invention to create footwear of correct size with fully stretched and "fully lasted" uppers, other objects of the invention such as simplification of the manufacturing methods to save material and labor are here under consideration. These objects are clarified hereafter in connection with the drawings which show in FIG. 1 one embodiment of a shoe according to the invention within the mold for the sole, partly in section. FIG. 2 shows the forepart of a shoe in the mold according to another embodiment, also partially in section. FIG. 3 shows a similar forepart of a shoe in the mold with the side rim of the sole provided with a mesh cover. FIG. 4 shows the upper of a turn shoe, with its parts all stitched together, ready for the turning thereof. FIG. 5 shows also a turn shoe, after turning and placing in a mold for the forming and vulcanization of a sole. FIG. 6 shows a shoe ready for placement into a mold shown below said shoe. FIGS. 7 and 8 show executions of the invention where the upper is held in the mold by a ridge at the lower margin suitable to hook under the lip of the mold.

The shoe according to the invention, as shown in FIG. 1 comprises an upper 1 to which a sock lining 2 is stitched along the lower edge of the upper. Stitched thereto is also a strip 4 which consists preferably of perforated material such as mesh cloth. This strip extends outwardly so that it can be clamped between the bottom plate 5 of the mold and the frame part 6 of the mold. In the space between the bottom of the last and the bottom plate 5 a rubber mix, preferably a mix for the forming of porous rubber, is placed before the clamping of the strip 4 into the mold. When this mix is heated, it expands to form the sole 3. Under the pressure of this expansion the last is pushed upward, while the lower rim of the upper is held in its position through the strip 4 clamped in the mold. This slight upward movement of the last tightens the upper on the last and brings therewith the desired fit of the footwear. The pressure of the expanding rubber in the sole 3 causes the rubber to penetrate through the strip 4 and to form the outer side rim of the sole. After demolding, the excess of the strip 4 protruding beyond the rubber of the sole can easily be trimmed off.

As shown in FIG. 2 the same effect of tightening the upper on the last in the mold can be obtained by securing a strip 13 to the lower margin of the upper and to the edge of a tread or outsole 9, by a stitching 10. Again the expansion of the rubber in the sole will force the upper downward in relation to the last holding the lower margin of the upper so as to tighten said upper on the last. The mold 12 can then be of a single piece as the means to hold the bottom margin of the upper are located entirely within the mold cavity. A small lip 29 may be provided to locate the upper on the last on the mold.

While in the foregoing examples the means holding the bottom margin of the upper in the mold were located entirely within the rubber sole, FIG. 3 shows an embodiment of the invention where a strip 13 of perforated material is held to the lower margin of the upper by stitching 10 and to a tread sole 9 by stitching 11.

The stretching and tightening of the upper on the last during the vulcanization of the rubber sole allows form fitting shoes even by the manufacturing method usually referred to as "turn shoe" manufacture. As shown in FIG. 4 an upper 1 is connected through a strip 15 to the bottom margin of an upper to which also a sock lining 2 has been stitched. The sock lining is provided with an opening 20 to facilitate the turning of the upper so that it can be placed onto the vulcanization last. A counter pocket 18 is fastened by stitching 19 to the quarter of the shoe. A pocket 16 for a box toe is fastened by the stitching 17 to the toe part of the shoe. When the upper shown in FIG. 4 is turned, placed on the vulcanization last after the rubber mix for the sole is inserted through the opening 20 (which might be a single slit or cut) between the tread sole 9 and the sock lining 2, the tightening of the upper and the vulcanization of the rubber sole can be carried out in a mold as shown in FIG. 3. The expanding rubber will also penetrate into the counter pocket 18 and the box toe pocket 16 so as to form a counter and box toe of rubber.

The strip of material connecting the bottom margin of the upper 1 to the tread sole 9 can also be formed by an extension of the upper itself as shown in FIG. 5, or by an extension of the tread sole. According to the invention the mold 12 is dimensioned so as to allow the last to rest somewhat on a ridge 23. This ridge facilitates the correct positioning of the last with the upper in the mold, so that the rubber sole 3, formed and vulcanized in the mold after such positioning presents the desired and correct dimensions. When the upper on the last is placed into the mold the tread sole 9 will normally not rest on the bottom surface of the cavity and the upper itself will be relatively loose on the last. The expansion of the rubber mix will push the tread sole 9 against the bottom face of the cavity and pull the upper past the ridge 23 into the mold cavity. FIG. 5 discloses also how the rubber penetrates between the counter pocket 18 and the heel cover 22 to form the rubber counter 21. This formation of the counter occurs simultaneously with the formation of the sole and therefore practically without added costs. Being homogenous with the rubber sole itself it eliminates any danger of separation between counter and heel.

It is desirable to hold the upper on the last, while placing it into the mold. The usual shape of the counter locks the upper on the last of the vulcanization device in the rear part of the shoe. According to the invention FIG. 6 the strip material 4 stitched by the seam 10 to the upper 1 is used to gather the bottom edge of the upper so as to create a hollow in which the toe of the last can be placed. The mold 12 can again be provided with the lip 29, and is also provided with a ridge 27 in the bottom surface 25 of the cavity. When the tread sole 9 is placed into the cavity, the pressure of the rubber on bottom tread sole and last bottom will force the tread sole against the ridge 27 and seal it there against penetration of the rubber between tread sole and the bottom 25 of the cavity. The rubber which penetrates through the perforations of the material strip 4 will fill the cavity up to the lip 29 in such manner that the edge of the tread sole including the stitching 9 will be embedded in the side rim of the rubber sole.

As illustrated in FIG. 1 the side rim of the upper may be held in the mold against the movement of the side rim while the upper is stretched over the last by the vertical movement thereof by means of a strip of material clamped by the side frame and the bottom plate of the mold. If such clamping shall be avoided the invention provides, as shown in FIG. 7, that the bottom margin 30 of the upper 1 is provided with a ridge 31 which can rest against the inner surface 32 of the cavity of the mold 12. The ridge 31 can be created by a seam 33 through a fold 34 of the upper material. If heavy stitching thread is used it is not necessary to fold the material of the upper but other material might be added or even a simple heavy stitch might be sufficient. If desired, a sock lining 35 can be fastened to the upper simultaneously by the stitching 33.

FIG. 8 shows a realization of the invention in which again a stitching 33 is used to retain the bottom margin of the upper in the mold while the last is pushed upward to stretch and tighten the upper. The ridge 31 is here made heavier by the incorporation of a cord 36. The upper extends beyond the stitch 33 into the sole area and is fastened there by the seam 37 to the tread sole 38. Openings 39 in this extension of the upper allow the equalization of pressure in the area of the side rim and the area in the center of the sole. These two areas might be filled with different mixes. As example, the mix for the area of the rim 40 might be without blowing agent, while the mix for the area 41 in the center of the sole might contain blowing agent. The mix for the area 40 can be placed in the mold before placing the upper on the last in the mold, while the mix for the center of the sole might be placed before the actual molding operation between upper and last through the opening 42 in the sock lining 35. The pressure of the elastomeric material in the area 41 will not only force the tread sole 38 to mate exactly the bottom of the mold cavity, but will also mold the material in the area 40 and force the upper in relation to the last (not shown in FIG. 8) perpendicular to the mold bottom to stretch and tighten the upper.

In the foregoing the material for the forming of the sole is described as rubber. This term is used here to mean any natural or synthetic elastomer with the qualities usually associated with rubber from the Hevea plant. The mix used for the creation of pressure between the bottom of the last and the bottom of the mold might be selected to cure by vulcanization, polymerization or other chemical changes. The pressure of the elastomeric material used according to the invention for vertical movement of the upper in relation to the last in order to tighten the latter can be obtained by heating of the mix inserted in the above described space, or by other means such as injection of a liquid mix into said space. The expansion of the mix is strongly increased by inclusion of blowing agents into the elastomer, but experience has shown that even without such blowing agents the expansion of the air bubbles normally found in elastomer mixes is sufficient when heat is applied to create the desired pressure. This pressure causes the tightening of the upper by pulling the bottom edge thereof in a vertical direction downward in relation to the last either by connecting the bottom edge to a tread sole and moving the tread sole downwardly, or by moving the last, or by holding the bottom margin of the upper in the mold and moving the mold downward in relation to the last. Such movement might include the entire cavity, such as in a one-piece mold (FIGS. 2, 3, 6, 7) or the side frame only of a divided mold.

What is claimed is:

1. In a process of manufacturing footwear with soles of elastomeric material molded and cured to the bottom margin of the upper wherein the upper has been placed on a last of a mold, the mold is fully closed and an elastomeric material is molded in the mold, the improvement which comprises tightening the upper on the last while in the mold by exerting pressure through the elastomeric material while in the mold to move the upper and last relative to each other to tighten the upper on the last, and maintaining the upper so tightened while the elastomeric material is molded to form the shoe sole and is cured and bonded to the bottom margin of the upper.

2. In a process of manufacturing footwear with soles of elastomeric material molded and cured to the bottom margin of the upper wherein the upper has been placed on a last of a mold, the mold is fully closed and an elastomeric material is molded in the mold, the improvement which comprises holding the bottom portion of the upper to prevent movement thereof relative to the mold, exerting pressure through the elastomeric material while in the mold to move the last relative to the upper to stretch the upper and tighten the upper on the last and maintaining the upper so tightened while the elastomeric material is molded to form the shoe sole and is cured and bonded to the bottom margin of the upper.

3. In a process of manufacturing footwear with soles of elastomeric material molded and cured to the bottom margin of the upper and a tread sole wherein the upper has been placed on a last of a mold the mold is fully closed and an elastomeric material is molded in the mold, the improvement which comprises holding the bottom portion of the upper to prevent movement thereof relative to the mold, exerting pressure through the elastomeric material between the tread sole and last while in the mold to move the last relative to the upper to stretch the upper and tighten the upper on the last, and maintaining the upper so tightened while the elastomeric material is molded to form the shoe sole and is cured and bonded to the bottom margin of the upper.

4. In a process of manufacturing footwear with soles of elastomeric material molded and cured to the bottom margin of the upper and a tread sole wherein the upper has been placed on a last of a mold and an elastomeric material is molded in the mold, the improvement which comprises securing a strip to the lower portion of the upper, securing the unsecured end of the strip to the tread sole to hold the bottom portion of the upper to prevent movement thereof relative to the mold, exerting pressure through the elastomeric material between the tread sole and last to move the last relative to the upper to stretch the upper and tighten the upper on the last, and maintaining the upper so tightened while the elastomeric material is molded to form a mid-sole which is cured and bonded to the strip, bottom of the upper and the tread sole.

5. In a process of manufacturing footwear with soles of elastomeric material molded and cured to the bottom margin of the upper wherein the upper is formed with a reinforced pocket such as for a counter and a toe cap and the upper has been placed on a last of a mold and an elastomeric material is molded in the mold, the improvement which comprises holding the bottom portion of the upper to prevent movement thereof relative to the mold, exerting pressure through the elastomeric material while in the mold to move the last relative to the upper to stretch the upper and tighten the upper on the last, and maintaining the upper so tightened while the elastomeric material is molded to fill the pocket and to form the shoe sole and is cured and bonded to the bottom margin of the upper.

6. In a process of manufacturing footwear with soles of elastomeric material molded and cured to the bottom margin of the upper and a tread sole wherein the upper has been placed on a last of a mold and an elastomeric material is molded in the mold, the improvement which comprises securing the bottom portion of the upper to the tread sole to hold the bottom portion of the upper to prevent movement thereof relative to the mold, exerting pressure through the elastomeric material between the tread sole and last to move the last relative to the upper to stretch the upper and tighten the upper on the last, and maintaining the upper so tightened while the elastomeric material is molded to form a mid-sole and is cured and bonded to the tread sole and the bottom margin of the upper.

7. In a process of manufacturing footwear with soles of elastomeric material molded and cured to the bottom portion of the upper wherein the upper has a ridge formed on the lower portion thereof adjacent its juncture with the sole and the upper has been placed on a last of a mold and an elastomeric material is molded in the mold, the improvement which comprises holding the ridge to hold the bottom portion of the upper to prevent movement thereof relative to the mold, exerting pressure through the elastomeric material while in the mold to move the last relative to the upper to stretch the upper and tighten the upper on the last, and maintaining the upper so tightened while the elastomeric material is molded to form the shoe sole and is cured and bonded to the ridge and the bottom margin of the upper.

References Cited

UNITED STATES PATENTS

| | | | |
|---|---|---|---|
| 2,256,329 | 9/1941 | Szerenyi et al. | 12—142 X |
| 2,651,118 | 9/1953 | Root | 12—142 X |
| 2,956,313 | 10/1960 | Choice | 12—142 X |

PATRICK D. LAWSON, Primary Examiner